US011658700B2

(12) United States Patent
Dennis (10) Patent No.: US 11,658,700 B2
(45) Date of Patent: May 23, 2023

(54) SYSTEMS AND METHODS TO PREDICT FREQUENCY INTERFERENCE (71) Applicant: DISH Network L.L.C., Englewood, CO (US)

(72) Inventor: Daniel Dennis, Cheyenne, WY (US)

(73) Assignee: DISH NETWORK L.L.C., Englewood, CO (US)

(*) Notice: Subject to any disclaimer, the term of this patent is extended or adjusted under 35 U.S.C. 154(b) by 0 days.

(21) Appl. No.: 17/028,908

(22) Filed: Sep. 22, 2020

(65) Prior Publication Data
US 2022/0094390 A1 Mar. 24, 2022

(51) Int. Cl.
H04B 1/715 (2011.01)
H04B 1/7143 (2011.01)
H04W 28/04 (2009.01)
H04L 1/20 (2006.01)

(52) U.S. Cl.
CPC ............ *H04B 1/715* (2013.01); *H04B 1/7143* (2013.01); *H04L 1/20* (2013.01); *H04W 28/04* (2013.01); *H04B 2001/7154* (2013.01)

(58) Field of Classification Search
CPC .................. H04B 1/715; H04B 1/7143; H04B 2001/7154; H04L 1/20; H04W 28/04
USPC ........................................................ 375/132
See application file for complete search history.

(56) References Cited

U.S. PATENT DOCUMENTS

| 7,852,963 | B2* | 12/2010 | Chen | H04B 7/0617 375/267 |
| 10,840,968 | B2* | 11/2020 | Moorti | H04B 1/525 |
| 2002/0186749 | A1 | 12/2002 | Jones | |
| 2004/0137849 | A1* | 7/2004 | Kloper | H04B 1/715 455/67.11 |
| 2016/0050589 | A1* | 2/2016 | Safavi | H04B 17/318 455/436 |
| 2020/0112883 | A1* | 4/2020 | Naik | H04W 28/08 |
| 2021/0376877 | A1* | 12/2021 | Wolokita | H04B 17/336 |

OTHER PUBLICATIONS

Roed, "Bluetooth Adaptive Frequency Hopping on a R&S CMW, Application Note," http://www.rohde-schwarz.com/appnote/1C108, Dec. 14, 2016, 19 pages.
Hodgdon, "Adaptive Frequency Hopping for Reduced Interference between Bluetooth® and Wireless LAN," Design & Reuse, May 2003, 3 pages.

* cited by examiner

*Primary Examiner* — Don N Vo
(74) *Attorney, Agent, or Firm* — Seed IP Law Group, LLP (57) ABSTRACT A frequency interference prediction system, used to electronically detect signals transmitted from one or more devices at a specified frequency. For each of the detected signals, the frequency interference prediction system detects the packet error rate, signal strength, and frequency channel and records the time the signal was detected. The frequency interference prediction system determines whether there is interference on the frequency channel at the time the signal was detected based on the packet error rate, signal strength, and frequency channel. The frequency interference prediction system then predicts whether there will be interference on the signal at a future time based on the determination that there was interference on the frequency channel and the times the signals were detected.

17 Claims, 9 Drawing Sheets

Fig. 3 device identification table

| Device ID | Device Name | Normal Active Hours | Device Type | Device Priority |
|---|---|---|---|---|
| 1111 | My Assistant | 12:01AM – 11:59PM | Smart Speaker | 2 |
| 2222 | My Laptop | 8:30AM – 6:30PM | Personal Computer | 1 |
| 3333 | Unknown | 2:00PM – 6:00PM | Unknown | 9999 |
| 4444 | My TV | 6:00AM – 8:00AM; 7:00PM – 10:00PM | Smart Television | 2 |
| 5555 | My Toaster | 8:00AM – 8:15AM | Smart Toaster | 6 |
| 6666 | Unknown | 11:30PM – 9:00 AM | Unknown | 9999 |
| ... | ... | ... | ... | ... |

*Fig. 4* frequency strength table

| Device ID | Device Name | Measurement Time | Packet Error Rate | Received Signal Strength Indicator (in dBm) | Frequency Channel |
|---|---|---|---|---|---|
| 2222 | My Laptop | 8:00AM – 8:30AM | 15% | -45 | 1 |
| 1111 | My Assistant | 8:00AM – 8:30AM | 2% | -30 | 2 |
| 3333 | Unknown | 8:00AM – 8:30AM | 15% | -60 | 1 |
| 2222 | My Laptop | 8:30AM – 9:00AM | 5% | -35 | 1 |
| 6666 | Unknown | 8:30AM – 9:00AM | 20% | -60 | 3 |
| 1111 | My Assistant | 8:30AM – 9:00AM | 20% | -75 | 3 |
| ... | ... | ... | ... | ... | ... |

*Fig. 5*

| | 601 | 602 | 603 | 604 |
|---|---|---|---|---|
| frequency channel schedule table | | | | |
| Device ID | Device Name | Scheduled Time | Frequency Channel |
| 1111 | My Laptop | 8:00 – 8:30 | 3 |
| 2222 | My Assistant | 8:00 – 8:30 | 2 |
| 1111 | My Laptop | 8:30 – 9:00 | 1 |
| 2222 | My Assistant | 8:30 – 9:00 | 2 |
| ... | ... | ... | ... |
| 610 | 611 | 612 | 613 |

SYSTEMS AND METHODS TO PREDICT FREQUENCY INTERFERENCE

BRIEF SUMMARY

Wireless devices communicate by transmitting data at certain frequencies, such as 2.4 GHz for Bluetooth and Wi-Fi communication. Additionally, devices may transmit data by using certain "channels" available on the frequency. However, the large number of devices typically owned by individuals, households, businesses, etc., often cause interference with each other by transmitting data at the same frequency or by using overlapping frequency channels. While wireless devices are able to switch between several frequency channels to lower the likelihood of interference, they are unable to predict the likelihood that a new frequency channel will have less interference than the current channel.

The embodiments disclosed herein address the issues above and thus help solve the above technical problems and improve data transmission technology by providing a technical solution that collects data from nearby wireless devices to predict frequency interference. Additionally, the embodiments disclosed herein are further able to create a schedule designed to limit and/or reduce interference on the frequency. In some embodiments, a frequency interference prediction system detects one or more signals to determine if there is interference on a frequency channel and predict whether there will be future interference on the frequency channel. In some embodiments, the frequency interference prediction system receives one or more signals and transmits an indication of a prediction of whether there will be interference on the frequency channel to a device. In some embodiments, the frequency interference prediction system includes a frequency interference prediction data structure including data which can be used to predict whether there will be interference on a frequency channel at a later time.

DETAILED DESCRIPTION

In data transmission and accounting for interference on certain frequencies or frequency channels, electronic devices generally cannot predict whether interference will occur in the future. Additionally, when interference is detected, electronic devices are limited to switching to another frequency channel without a prediction of whether the frequency channel will allow for communication with less interference. Furthermore, traditional methods of accounting for interference on a frequency do not take into account data indicating whether other devices near the electronic device experience interference on the frequency.

Finally, traditional methods of accounting for interference include "frequency hopping" where the channel is changed according to a set routine until a frequency channel with an acceptable amount of interference is found, or where the channel is constantly changed to avoid collisions. This method requires either constantly shifting to new frequency channels or switching to channels which may not be the best channel to transmit signals without interference, both of which can cause an inefficient use of computing and power resources.

The embodiments disclosed herein address the issues above and thus help solve the above technical problems and improve data transmission technology by providing a technical solution that detects signals on certain frequencies and frequency channels and uses data describing the signals to predict whether interference will occur on the frequency channel in the future. In some embodiments, a frequency interference prediction system, or frequency interference prediction device, electronically detects signals transmitted from one or more frequencies over a period of time. After detecting the signals, the frequency interference prediction system detects a packet error rate, a signal strength, a time the signal was detected, and a frequency channel of the signal for each of the signals detected to determine whether there is interference on the frequency at the time the signal was detected. Additionally, the frequency interference prediction system uses the determinations of whether there is interference on the frequency to predict whether there will be interference on the frequency at a future time. The frequency interference prediction system is able to operate more efficiently than traditional frequency hopping because it can identify frequency channels with little to no interference and then immediately instruct a device to switch to that frequency channel.

In some embodiments, the frequency interference prediction system utilizes a machine learning model to predict whether there will be interference on the frequency at a future time. The frequency interference prediction system may be configured to predict whether a specific frequency channel will have interference at a future time. The frequency interference prediction system may utilize the prediction of whether a specific frequency channel will have interference at a future time to create a schedule detailing when a frequency channel should be used or avoided.

In some embodiments, the frequency interference prediction system identifies one or more frequency channels predicted not to have interference at a future time. The frequency interference prediction system may transmit a signal to one or more devices instructing the one or more devices to use the one or more frequency channels predicted to not have interference at the future time. The frequency interference prediction system may transmit a signal to one or more devices instructing the one or more devices not to use the one or more frequency channels predicted to not have interference at the future time.

In some embodiments, the frequency interference prediction system may choose which devices to transmit the instruction based on the device's priority. The device priority may be based on one or more of user input, frequently used times, amount of time used, type of device, etc. The frequency interference prediction system may create a schedule for each device which instructs the device to use one or more frequency channels at certain future times based on the device priority. The frequency interference prediction system may identify a device as a priority device based on the device priority received via one or more of user input, frequently used times, amount of time used, type of device, etc.

In some embodiments, the frequency interference prediction system identifies signals from foreign devices, for example, devices which do not belong to the user. The frequency interference prediction system may use the data obtained from the signals to identify the foreign device or its device type. The frequency interference prediction system may further use data describing the signals from the foreign device to predict whether there will be interference on the frequency, or the frequency channel, at a future time.

In some embodiments, a device transmits one or more signals using a frequency channel and receives an indication to use an alternate frequency channel. The indication to use an alternate frequency channel may be based on a prediction, by a frequency interference prediction system, that there will be interference on the frequency at the future time. The prediction may be based on one or more of a packet error rate of the signal, a signal strength of the signal, and a time the signal was received by the frequency interference prediction system. The indication may include an indication of a prohibited frequency channel and the device may avoid transmitting signals at the prohibited frequency. The frequency interference and prediction system may determine the alternate frequency based on a machine learning model.

In some embodiments, a device receives an instruction to transmit signals by using the alternate frequency channel at a future time. The instruction to transmit signals by using the alternate frequency channel at the future time may be based on a prediction, by a frequency interference prediction system, that there will be interference on the frequency at the future time. The device may transmit identifying information to the frequency interference prediction system. The device may receive a future time and a prohibited frequency channel from the frequency interference prediction system. The frequency interference prediction system may utilize data from another frequency interference prediction system to determine an alternative frequency channel, future time when interference is predicted, prohibited frequency channel, etc.

In some embodiments, the frequency interference prediction system includes a frequency interference prediction data structure. The frequency interference prediction data structure may include information specifying one or more signals, such as a packet error rate of the signal, a signal strength of the signal, or the time the signal was detected. The frequency interference prediction data structure may also include information specifying a frequency of the signal. The frequency interference prediction system may use the information specifying the signals to determine whether there is interference on the frequency. The frequency interference prediction system may use the information specifying the signals to predict whether there will be interference on the frequency at a future time.

In some embodiments, the frequency interference prediction data structure includes information specifying one or more devices which transmit signals on the frequency. The frequency interference prediction data structure may include a device type, a frequency channel the device is permitted to use, or a frequency channel the device is prohibited from using. The frequency interference prediction data structure may include information specifying a device priority. The information specifying a device priority may be used to create a schedule for individual devices to use one or more frequency channels based on the prediction of whether there will be interference on the frequency channel at a future time. The information specifying a device priority may be used to determine whether a device is a priority device (i.e., a device which the frequency interference prediction system should prioritize assigning frequencies with frequency channels that have a lower probability of having interference). The frequency interference prediction data structure may include information specifying the active hours for a device or user. The information specifying active hours may be used to create a schedule for individual devices to use one or more frequency channels. The frequency interference prediction data structure may be used by a frequency interference prediction system to train a machine learning model usable to predict whether there will be interference on the frequency at a future time.

In some embodiments, the frequency interference prediction system obtains input from a user and the user input is used in the determination of whether there will be interference on a frequency channel at a future time. The user input may include information specifying one or more devices, such as a device type, device name, typical active hours of the device, device priority, etc. The frequency interference prediction system may determine a device's active hours based on the detected signals.

In some embodiments, the frequency interference prediction system utilizes a mixture of traditional frequency hopping and identifying frequency channels likely to have interference in the future to determine which frequency channel a device should use to transmit signals. The frequency interference prediction system may communicate with other frequency interference prediction systems to predict which frequencies or frequency channels are likely to have interference at a future time. The frequency interference prediction system may also communicate with other frequency interference prediction systems to determine the most efficient use of the frequency channels available to both of the frequency interference prediction systems. The frequency hub may also negotiate with other frequency hubs, even those not owned by the same user, to ensure the most efficient use of the available bandwidth. For example, in some embodiments, devices owned by the same user may include or consist of devices that are accessible and/or controlled by the same user. The frequency interference prediction system may communicate with other nearby frequency interference prediction systems to determine which frequency channels should be used based on each individual frequency interference prediction system's needs at the time.

The frequency interference prediction system may operate on a standalone device or "hub" designed to receive signals from a multitude of devices. The frequency interference prediction system may be integrated as part of an existing device such as a personal computer, laptop, smart home system, digital assistant device, Internet of Things device, etc.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
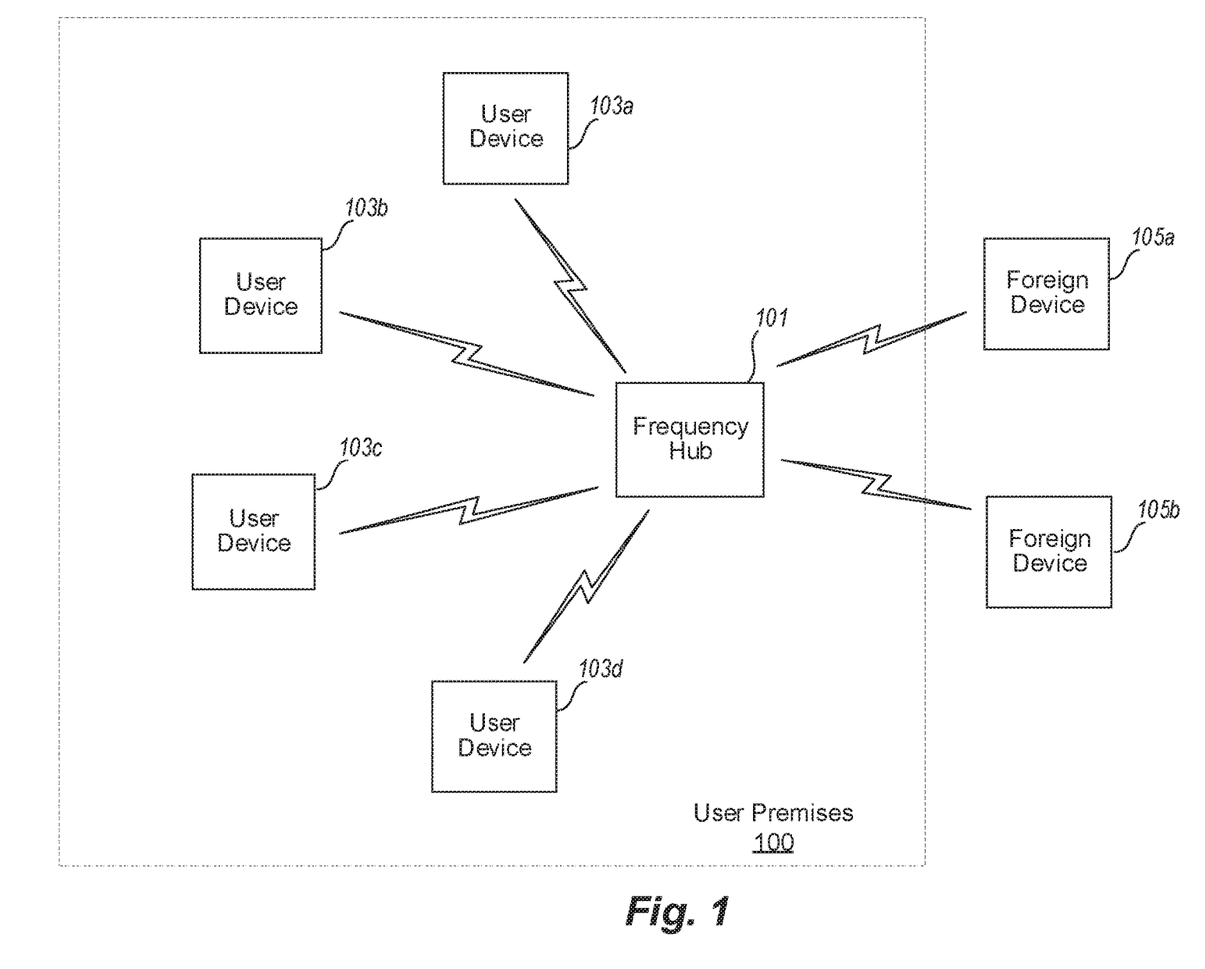
FIG. 1 is a diagram depicting an example frequency interference prediction system and a user premises in which a frequency interference prediction system may be implemented.

FIG. 1 is a diagram depicting an example frequency interference prediction system and a user premises 100 in which a frequency interference prediction system may be implemented. It is to be appreciated that FIG. 1 illustrates just one example of a user premises 100 and that the various embodiments discussed herein are not limited to the use of such an environment. The example user premises 100 includes a frequency hub 101, one or more user devices 103a-103d, and one or more foreign devices 105a and 105b. The user premises 100 may include a variety of user devices 103a-103d and foreign devices 105a and 105b which may be communicatively coupled to one or more frequency hubs 101 and/or to each other.

The user premises may also include an optional network, communication system, or networked system (not shown), to which the frequency hub 101, as well as user devices 103a-103d and foreign devices 105a and 105b (collectively referred to as endpoint devices), may be coupled. Non-limiting examples of such a network or communication system include, but are not limited to, an Ethernet system, twisted pair Ethernet system, an intranet, a local area network ("LAN") system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, wireless LAN, WiFi, Worldwide Interoperability for Microwave Access ("WiMax") devices, or the like, may be communicatively coupled to the network and/or to each other so that the plurality of endpoint devices are communicatively coupled together. Thus, such a network enables the frequency hub 101, user devices 103a-103d, foreign devices 105a and 105b, and any other interconnected endpoint devices, to communicate with each other.

The user devices 103a-103d may include devices such as cellular telephones, smartphones, tablets, personal computers, laptop computers, wireless peripheral devices such as headphones, microphones, mice, keyboards, etc., security cameras, Internet of Things (or "smart") devices, televisions, routers, digital assistants, personal assistant devices—such as Amazon Alexa, Google Home, etc.,—drones, etc. The user devices 103a-103d may interconnect to one or more communications media or sources, such as routers, network switches, modems, etc., to transmit communications to other devices. The user devices 103a-103d may transmit signals at a predetermined frequency or frequency channel which are detected by the frequency hub 101.

The foreign devices 105a and 105b may include devices such as devices such as cellular telephones, smartphones, tablets, personal computers, laptop computers, wireless peripheral devices such as headphones, microphones, mice, keyboards, etc., security cameras, Internet of Things (or "smart") devices, televisions, routers, digital assistants, personal assistant devices—such as Amazon Alexa, Google Home, etc.,—drones, radios, etc. The foreign devices 105a and 105b may interconnect to one or more communications media or sources, such as routers, network switches, modems, etc., to transmit communications to other devices. The foreign devices 105a and 105b may be devices which are not controlled by the user of the frequency interference prediction system. The foreign devices 105a and 105b may be devices which the frequency interference prediction system can identify. The foreign devices 105a and 105b may be devices which the frequency interference prediction system can not identify.

The above description of the user premises 100, and the various devices therein, is intended as a broad, non-limiting overview of an example environment in which various embodiments of a frequency interference prediction system. The user premises 100 and the various devices therein, may contain other devices, systems and/or media not specifically described herein.

Example embodiments described herein provide applications, tools, data structures and other support to implement systems and methods for predicting future interference on a frequency or frequency channel. The example embodiments described herein additionally provide applications, tools, data structures and other support to implement systems and methods for predicting when interference on a specified frequency will occur and taking actions to mitigate the interference experienced by user devices. Other embodiments of the described techniques may be used for other purposes, including for creating a schedule for devices to use certain frequencies or frequency channels. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
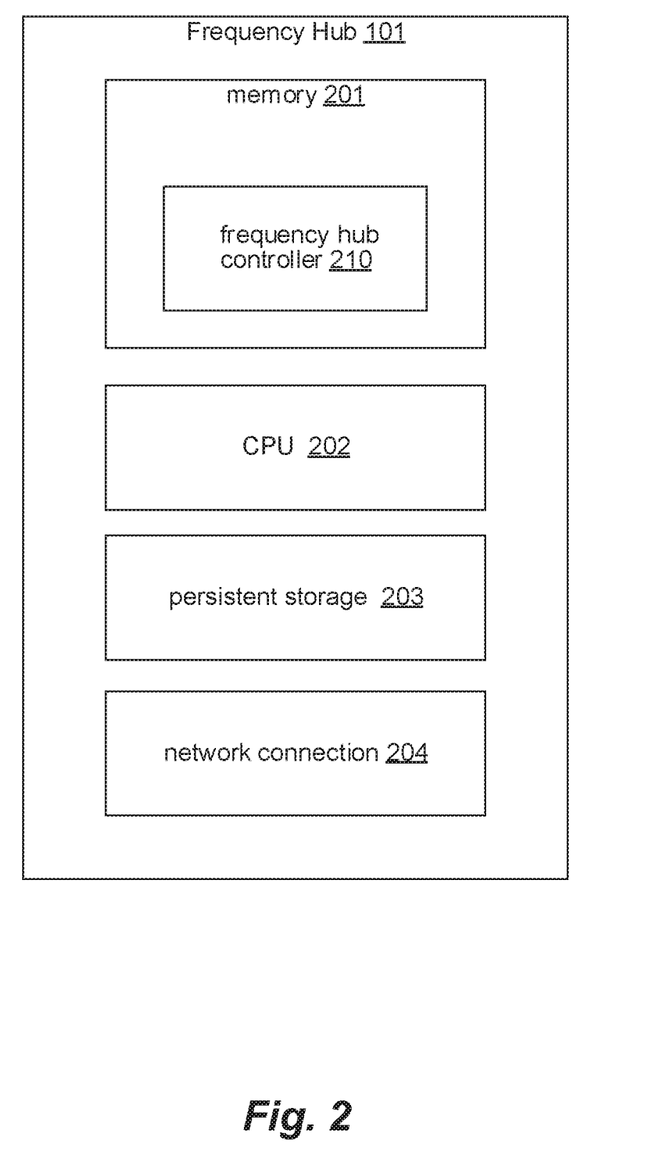
FIG. 2 is a block diagram depicting example components incorporated in a frequency hub on which the frequency interference prediction system may operate, according to various embodiments described herein.

FIG. 2 is a block diagram depicting example components incorporated in a frequency hub 101 on which the frequency interference prediction system may operate, according to various embodiments described herein. In various embodiments, the frequency hub 101 includes one or more of the following: a computer memory 201 for storing programs and data while they are being used, including data associated with the frequency interference prediction system, an operating system including a kernel, and device drivers; a central processing unit ("CPU") 202 for executing computer programs; a persistent storage device 203, such as a hard drive or flash drive for persistently storing programs and data; and a network connection 204 for connecting to one or more user devices, such as user devices 103a-103d and/or other computer systems, to send and/or receive data, such as via the Internet or another network and associated networking hardware, such as switches, routers, repeaters, electrical cables and optical fibers, light emitters and receivers, radio transmitters and receivers, and the like, and to scan for and retrieve signals from user devices 103a-103d and/or foreign devices 105a and 105b. While a frequency hub 101 configured as described above is typically used to support the operation of the frequency interference prediction system, those skilled in the art will appreciate that the frequency interference prediction system may be implemented using devices of various types and configurations, and having various components. The memory 201 may include a frequency hub controller 210 which contains computer-executable instructions that, when executed by the CPU 202, cause the frequency hub 101 to perform the operations and functions described herein. For example, the programs referenced above, which may be stored in computer memory 201, may include or be comprised of such computer-executable instructions.

The frequency hub controller 210 performs the core functions of the frequency hub 101, as discussed herein and also with respect to FIGS. 4 through 9. In particular, the frequency hub controller 210 obtains signal data from the user devices 103a-103d and/or the foreign devices 105a and 105b, and uses the signal data to determine whether there is interference on the frequency channel and whether there will be interference on the frequency channel at a future time. The frequency hub controller 210 may additionally include instructions to receive an indication from a user of the device type, usage times, priority, etc., of a user device 103a-103d. The frequency hub controller 210 may additionally contain computer-executable instructions to cause the frequency hub to perform some or all of the operations further described in FIGS. 4-9. The frequency hub controller 210 may additionally contain computer-executable instructions to implement an artificial neural network, machine learning, and/or other artificial intelligence components of the system to predict whether there will be interference on the channel at a future time and/or to determine an alternate frequency channel. The frequency hub controller 210 may also include computer-executable instructions for receiving input and using that input to predict whether interference will occur at a future time and/or to determine one or more frequency channels for one of the user devices 103a-103d to use at future time.

In an example embodiment, the frequency hub controller 210 and/or computer-executable instructions stored on memory 201 of the frequency hub 101 are implemented using standard programming techniques. For example, the frequency hub controller 210 and/or computer-executable instructions stored on memory 201 of the frequency hub 101 may be implemented as a "native" executable running on CPU 202, along with one or more static or dynamic libraries. In other embodiments, the frequency hub controller 210 and/or computer-executable instructions stored on memory 201 of the frequency hub 101 may be implemented as instructions processed by a virtual machine that executes as some other program.

Figure 3:
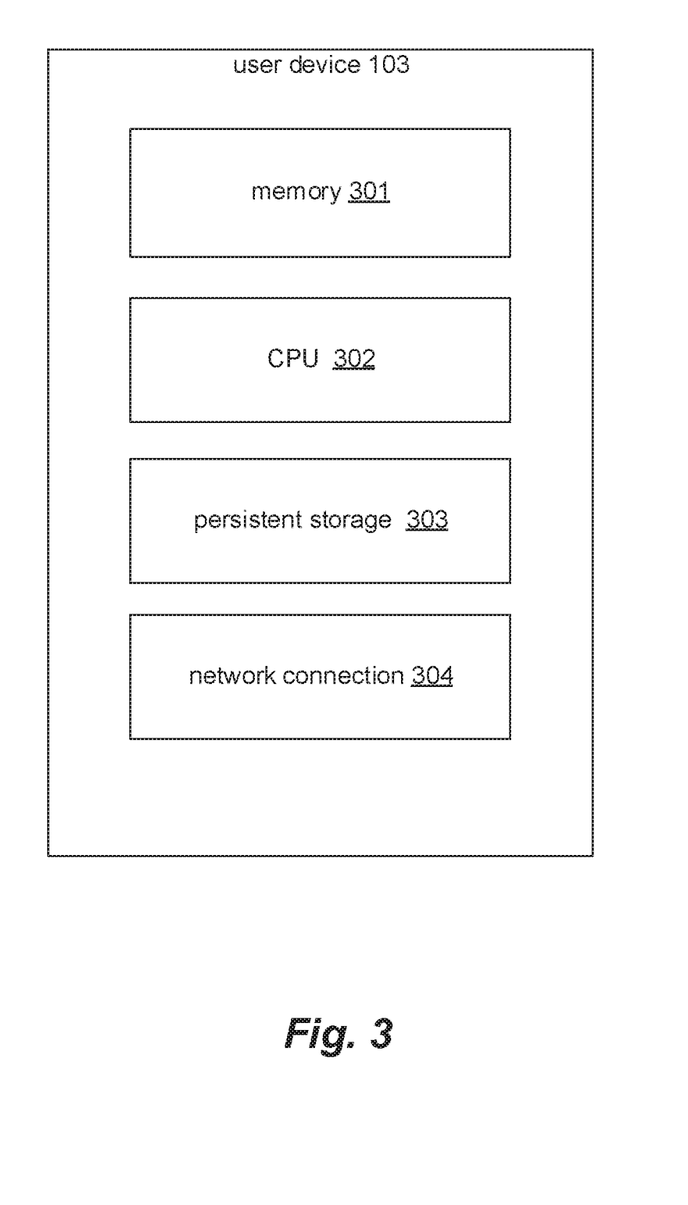
FIG. 3 is a block diagram depicting example components incorporated in a user device which may be included in the frequency interference prediction system according to various embodiments described herein.

FIG. 3 is a block diagram depicting example components incorporated in a user device 103 which may be included in the frequency interference prediction system according to various embodiments described herein. In various embodiments, the user device 103 includes one or more of the following: a computer memory 301 for storing programs and data while they are being used, including data associated with the frequency interference prediction system, an operating system including a kernel, and device drivers; a central processing unit ("CPU") 302 for executing computer programs; a persistent storage device 303, such as a hard drive or flash drive for persistently storing programs and data; and a network connection 304 for connecting to one or more user devices, such as user devices 103a-103d, foreign devices 105a and 105b, and/or other computer systems, to send and/or receive data, such as via the Internet or another network and associated networking hardware, such as switches, routers, repeaters, electrical cables and optical fibers, light emitters and receivers, radio transmitters and receivers, and the like. While a user device 103 configured as described above is typically used to support the operation of the frequency interference prediction system, those skilled in the art will appreciate that the frequency interference prediction system may be implemented using devices of various types and configurations, and having various components.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the frequency interference prediction system.

In addition, programming interfaces to the data stored as part of the frequency hub controller 210, can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The frequency hub controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the frequency hub 101, user devices 103a-103d, and/or foreign devices 105a and 105b.

Furthermore, in some embodiments, some or all of the components/portions of the frequency hub controller 210 and/or functionality provided by the computer-executable instructions stored on memory 201 of the frequency hub 101 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the frequency hubs, user devices, foreign devices, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Figure 4:
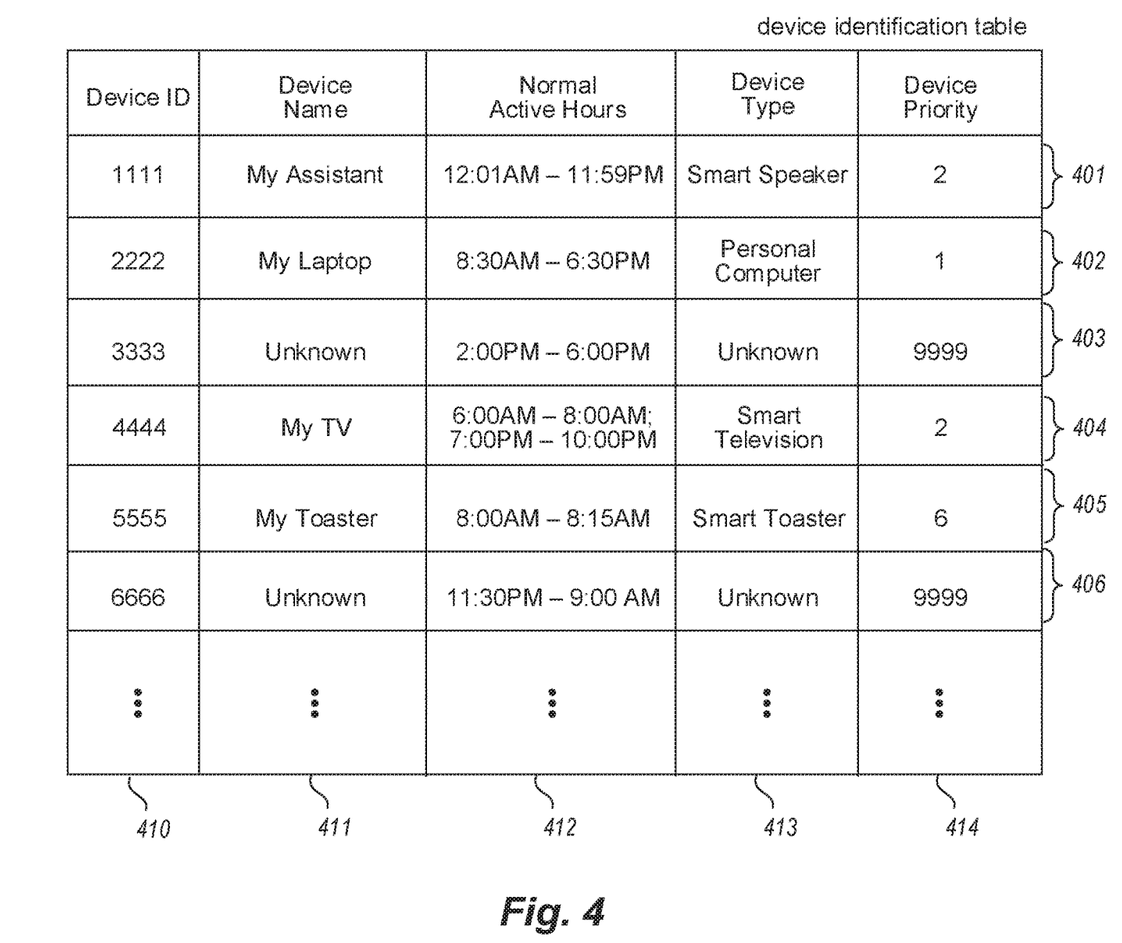
FIG. 4 is a table diagram showing sample contents of a device identification table used by the frequency interference prediction system, according to various embodiments described herein.

FIG. 4 is a table diagram showing sample contents of a device identification table used by the frequency interference prediction system, according to various embodiments described herein. For example, the device identification table may be, include, or comprise a data structure and associated data stored in, or accessible by, the frequency hub 101, one or more user devices 103a-103d, and/or one or more foreign devices 105a and 105b. In some embodiments, the information represented in the device identification table may be stored in various different types of data structures and/or in a neural network implemented or accessible by the frequency hub 101, one or more user devices 103a-103d, and/or one or more foreign devices 105a and 105b. The device identification table contains rows, such as rows 401-406, each corresponding to a different device. Each row is divided into the following columns: a device id column 410, a device name column 411, a normal active hours column 412, a device type column 413, and a device priority column 414.

The device id column 410 includes information indicating a device identified by the frequency interference prediction system. The device id column 410 may include a unique identifier for each device to allow the frequency interference prediction system to reliably differentiate devices from each other. The device name column 411 includes a device name for each device identified by the frequency interference prediction system. The device name may be obtained through user input, a signal from the device indicating its name, a signal or packet information present in the signal's metadata, etc.

The normal active hours column 412 includes information indicating when the device is typically active, such as when the device is transmitting signals by using a specified frequency or frequency channel. The normal active hours may be obtained from user input specifying when the device is typically in use. In some embodiments, the frequency interference prediction system obtains the normal active hours based on the time signals from the device are received. The frequency interference prediction system may use one or more of user input and data indicating when signals from the device are received to determine the normal active hours. The device type column 413 includes information indicating a device's type, such as a smart speaker, personal computer, smart television, smart toaster, etc. The frequency interference prediction system may obtain the device type from user input. The frequency interference prediction system may obtain the device type from metadata in signals received from the device. In some embodiments, the frequency interference prediction system may obtain the device type from one or more of the user input and metadata in signals received from the device.

The device priority column 414 includes information indicating the priority of the device. The device priority may be used to determine whether a device should be instructed to use a frequency or frequency channel by the frequency interference prediction system. The device priority may be obtained through user input. The frequency interference prediction system may determine the device priority based on the device's usage data and other data pertaining to the device, such as the active hours of the device, the device type, etc. In some embodiments, the user is presented with a series of questions designed to obtain information about their devices, such as the normal active hours, the device type, the device priority, etc. The frequency interference prediction system may use the information indicating the device priority to determine whether the device is a device which the frequency interference prediction system should prioritize assigning frequencies with frequency channels that have a lower probability of having interference (a "priority device"). In some embodiments, when the frequency interference prediction system cannot determine the device's name, priority, or type, the frequency interference prediction system stores a value, such as "unknown," "null," "unidentified," "9999," etc., or leaves the device name column 411, device type column 413, or device priority column 414 empty (i.e., a null value).

Rows 401-406 include sample data depicting the type of data stored in an example device identification table, and which may be used by the frequency interference prediction system to determine a frequency or frequency channel for one or more user devices to use in order to avoid interference on the frequency. For example, row 401 includes information describing a smart speaker device named "My Assistant" with active hours from 12:01 AM to 11:59 PM and a device priority of 2, indicating that it should be prioritized over any other device with a priority higher than 2. By contrast, row 403 includes information describing an unknown device which is active from 2:00 PM to 6:00 PM. The unknown device has a priority of 9999 to indicate that it should not be prioritized.

Figure 5:
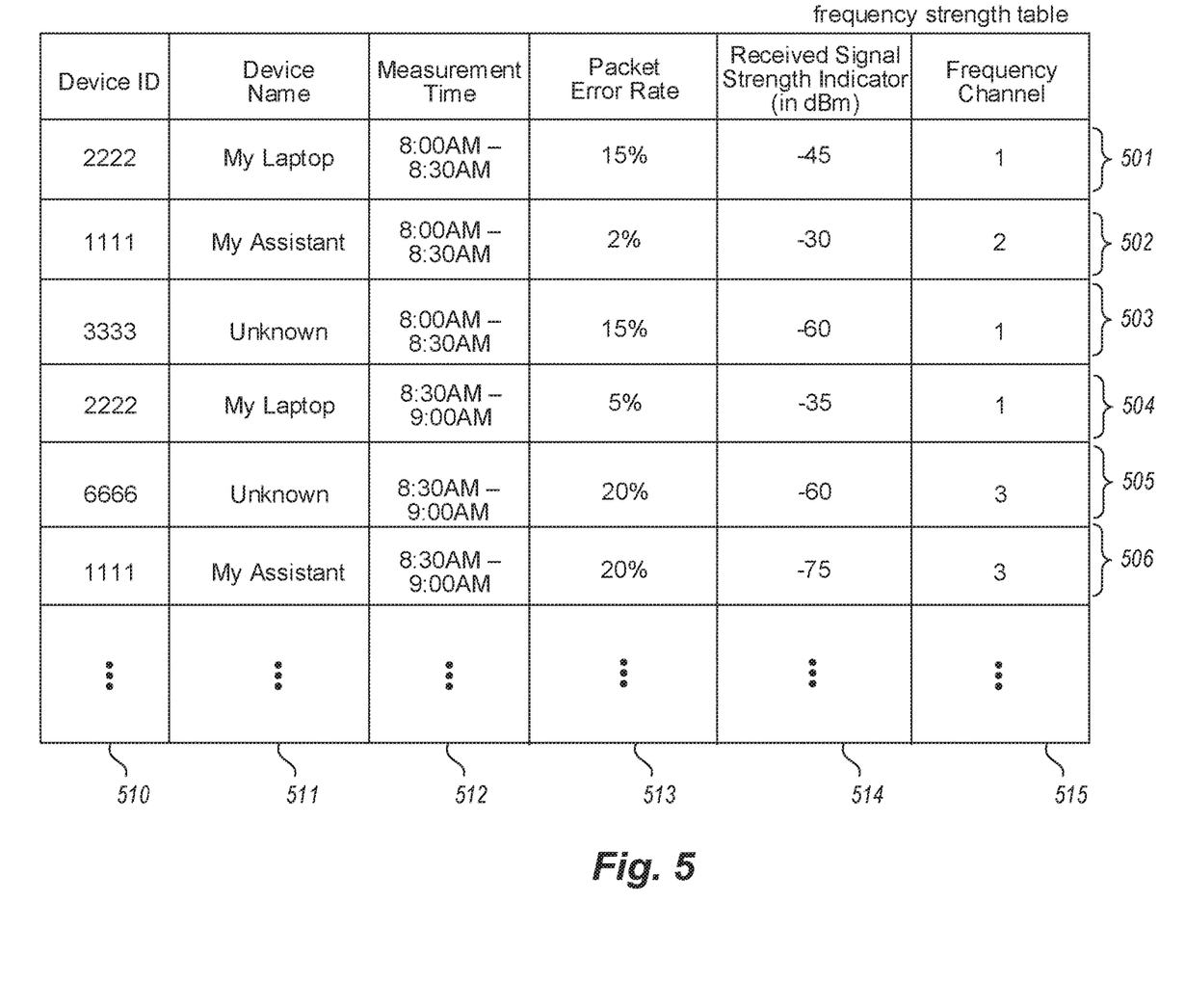
FIG. 5 is a table diagram showing sample contents of a frequency strength table used by the frequency interference prediction system, according to various embodiments described herein.

FIG. 5 is a table diagram showing sample contents of a frequency strength table used by the frequency interference prediction system, according to various embodiments described herein. For example, the frequency strength table may be, include, or comprise a data structure and associated data stored in, or accessible by, the frequency hub 101, one or more user devices 103a-103d, and/or one or more foreign devices 105a and 105b. In some embodiments, the information represented in the frequency strength table may be stored in various different types of data structures and/or in a neural network implemented or accessible by the frequency hub 101, one or more user devices 103a-103d, and/or one or more foreign devices 105a and 105b. The frequency strength table contains rows, such as rows 501-506, each corresponding to a different device's signal. Each row is divided into the following columns: a device id column 510, a device name column 511, measurement time column 512, a packet error rate column 513, a received signal strength indicator column 514, and a frequency channel column 515.

The device id column 510 and device name column 511 are similar to the device id column 410 and device name column 411. The measurement time column 512 includes data specifying the time at which one or more signals transmitted from the device are received by the frequency hub 101. The packet error rate column 513 includes data specifying the packet error rate of the signal as detected by the frequency hub 101. In some embodiments, the packet error rate is an average of the packet error rate of multiple signals over the period of time the one or more signals are received by the frequency hub 101. The received signal strength indicator column 514 includes a measurement of the signal strength of the one or more signals when they are received by the frequency hub 101. In some embodiments, the received signal strength indicator column 514 includes information specifying an average signal strength measured by the frequency hub 101, over the period of time the one or more signals are received by the frequency hub 101. The received signal strength indicator (RSSI) may be measured in dBm (decibels-milliwatts), where a higher value corresponds to a stronger signal. The frequency channel column 515 includes information specifying the frequency channel which the one or more signals were transmitted at during the time the frequency hub 101 received them.

Rows 501-506 include sample data depicting the type of data stored in an example frequency strength table, and which may be used by the frequency interference prediction system to determine a frequency or frequency channel for one or more user devices to use and/or to predict whether there will be future interference on a frequency or frequency channel. For example, row 501 indicates that the device "My Laptop" was transmitting signals at frequency channel 1 from 8:00 AM to 8:30 AM, with a packet error rate of 15% and an RSSI value at −45 dBm. Row 504 indicates that the device "My Laptop" had an improved packet error rate and RSSI value from 8:30 AM to 9:00 AM even though it continued to transmit data on the same frequency channel. Row 503 indicates that an unknown device was also transmitting signals on frequency channel 1, but stopped transmitting at 8:30 AM.

Figure 6:
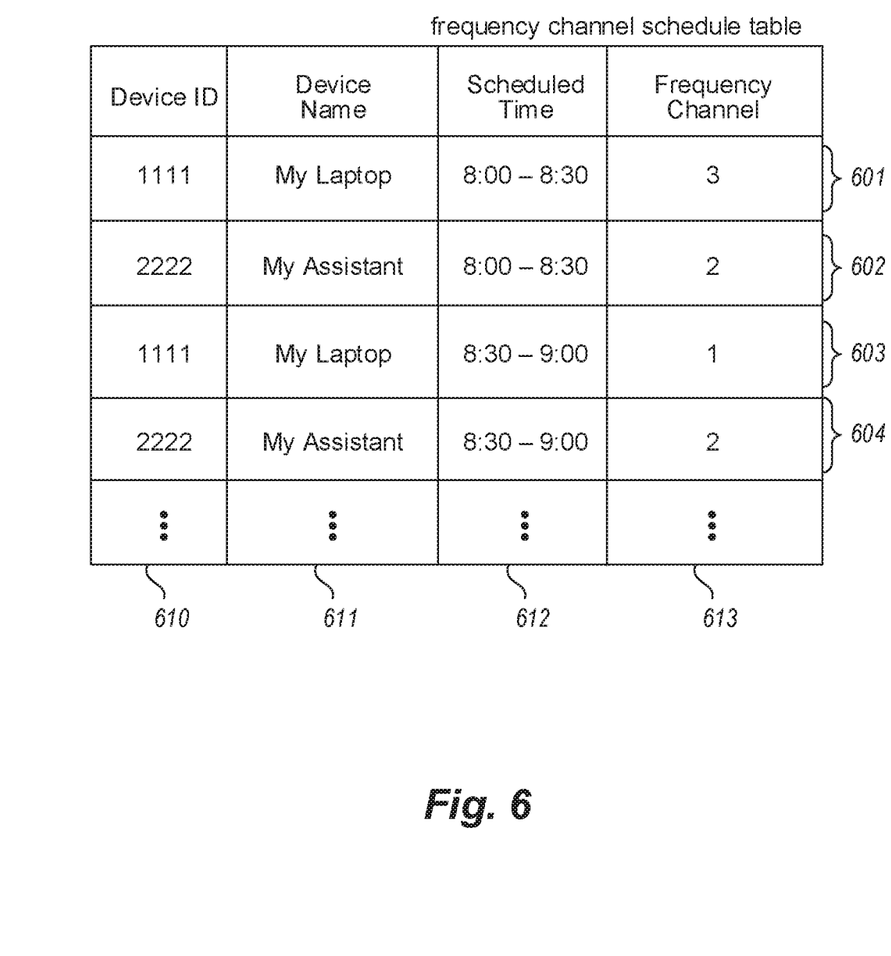
FIG. 6 is a table diagram showing sample contents of a frequency channel schedule table used by the frequency interference prediction system, according to various embodiments described herein.

FIG. 6 is a table diagram showing sample contents of a frequency channel schedule table used by the frequency interference prediction system, according to various embodiments described herein. For example, the frequency channel schedule table may be, include, or comprise a data structure and associated data stored in, or accessible by, the frequency hub 101, one or more user devices 103a-103d, and/or one or more foreign devices 105a and 105b. In some embodiments, the information represented in the frequency channel schedule table may be stored in various different types of data structures and/or in a neural network implemented or accessible by the frequency hub 101, one or more user devices 103a-103d, and/or one or more foreign devices 105a and 105b. The frequency channel schedule table contains rows, such as rows 601-604, each corresponding to a different device's scheduled frequency use. Each row is divided into the following columns: a device id column 610, a device name column 611, a scheduled time column 612, and a frequency channel column 613.

The device id column 610 and device name column 611 are similar to the device id column 410 and device name column 411. The scheduled time column 612 includes information indicating the time the device is scheduled to use the frequency channel specified in the frequency channel column 613 to avoid interference on the frequency channel. The frequency channel column 613 includes information indicating a frequency channel for a device to use in order to avoid interference. In some embodiments, the frequency column 613 may include information indicating more than one frequency channel and the device may use that information to implement frequency hopping by using the frequencies specified in the frequency channel column 613.

Rows 601-604 include sample data depicting the type of data stored in an example frequency channel schedule table, and which may be used by the frequency interference prediction system to instruct devices to use a specified frequency at specified times. For example, row 601 indicates that the device "My Laptop" will use frequency channel 3 at 8:00 AM, however, as indicated by row 603, "My Laptop" will switch to frequency channel 3 at 8:30 AM. The frequency interference prediction system may make this determination based on data in the device identification table and the frequency strength table. For example, the frequency strength table illustrated in FIG. 5 indicates that between 8:00 AM and 8:30 AM, "My Laptop" transmitted data using frequency channel 1 with an RSSI of −45 dBm and packet error rate of 15%. The frequency strength table illustrated in FIG. 5 additionally indicates that an unknown device was transmitting data using frequency channel 1 with an RSSI of −60 dBm and a packet error rate of 15%. The frequency strength table does not indicate that any device was using frequency channel 3 between 8:00 AM and 8:30 AM, so the frequency interference prediction system assigned frequency channel 3 to "My Laptop" from 8:00 AM to 8:30 AM in order to avoid unnecessary interference from the unknown device which is predicted to occur between 8:00 AM and 8:30 AM on frequency channel 1.

In various embodiments, other characteristics describing the signal or the device, such as the type of device, the device's priority, the number of available frequency channels, the total number of user devices, the type of data in the signal, etc., may be used in the determination of whether there will be interference on the frequency channel at a future time. Additionally, in various embodiments, characteristics describing the signal or the device, such as the type of device, the device's priority, the number of available frequency channels, the total number of user devices, the type of data in the signal, etc., may be used in the creation of a schedule, such as the frequency channel schedule table.

Figure 7:
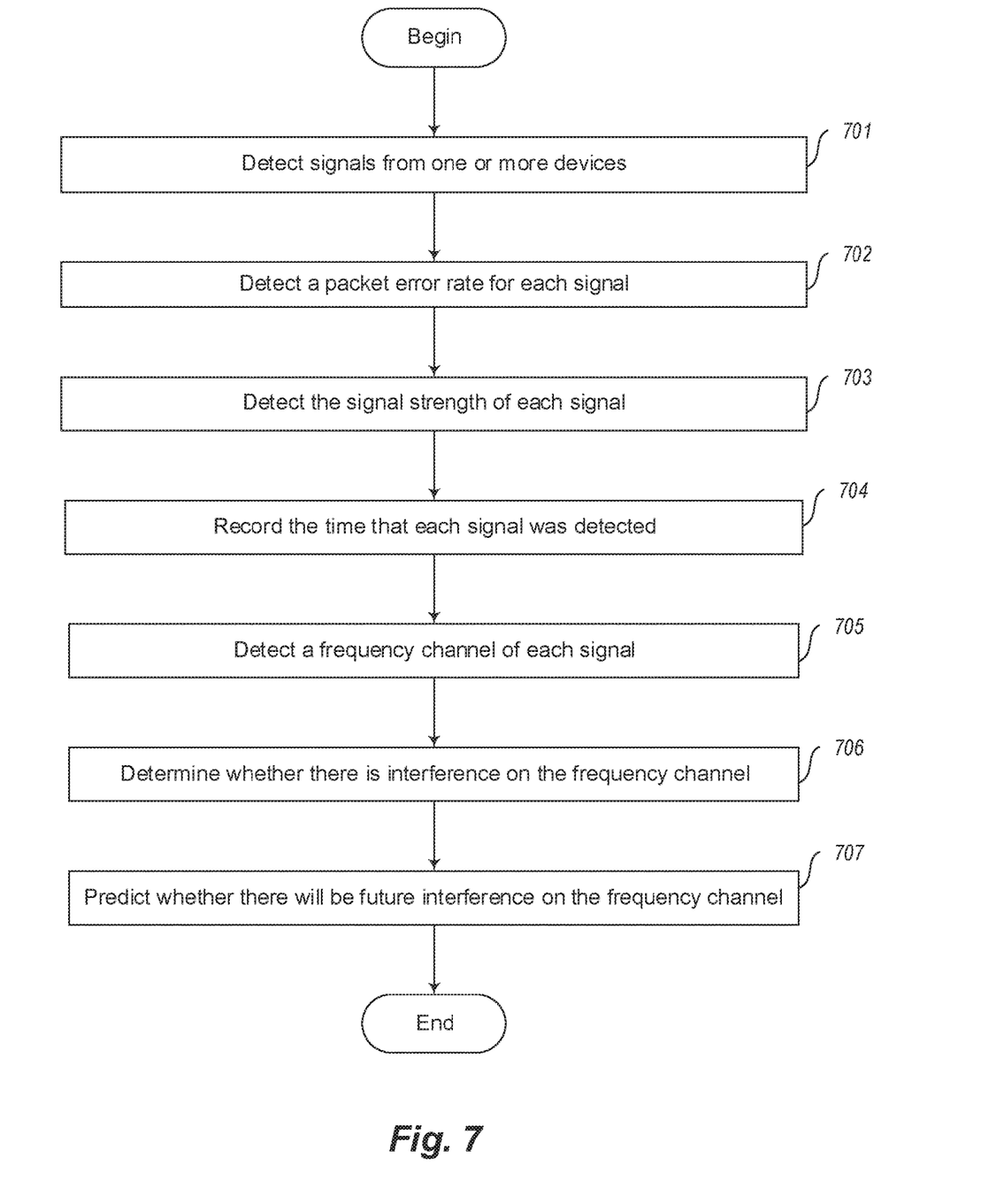
FIG. 7 is a flow diagram depicting a process to predict whether there will be future interference on a frequency channel in a frequency interference prediction system, according to various embodiments described herein.

FIG. 7 is a flow diagram depicting a process to predict whether there will be future interference on a frequency channel in a frequency interference prediction system, according to various embodiments described herein. At act 701, a frequency hub 101 detects signals transmitted at a predetermined frequency from one or more devices. At act 702, the frequency hub 101 detects a packet error rate for each of the detected signals. At act 703, the frequency hub 101 detects the signal strength of each signal, such as by detecting the received signal strength indication (RSSI) of a signal. At act 704, the frequency hub 101 records the time that each signal is detected. At act 705, the frequency hub 101 detects a frequency channel of each of the detected signals. At act 706, the frequency hub 101 determines whether there is interference on the channel based on the packet error rate and the signal strength of each signal.

At act 707, the frequency hub 101 predicts whether there will be interference on the frequency channel at a future time based on at least the determination of whether there is interference on the channel and the time the signals were detected. In some embodiments, the frequency interference prediction system utilizes an artificial neural network, machine learning and/or other artificial intelligence components of the system to predict whether there will be interference on the channel at a future time. The artificial neural network may be trained to assign predict whether there will be interference on the frequency channel based on at least the determination of whether there is interference on the channel and the time the signals were detected. The artificial neural network may be trained by using a dataset including determinations of whether there is interference on a frequency channel, signal strengths, packet error rates, times frequencies are detected, etc. The artificial neural network may be retrained as the frequency interference prediction system obtains additional signal data and additional data describing when interference is detected on the frequency.

In some embodiments, the frequency hub identifies which frequency channels are predicted to not have interference at the future time. The frequency hub may transmit a signal to one or more user devices instructing the device to transmit signals at the future time by using one or more of the frequency channels predicted to not have interference at the future time. In some embodiments, the frequency hub identifies which frequency channels are predicted to have interference at the future time. The frequency hub may transmit a signal to one or more user devices instructing the device not to use the frequency channels predicted to have interference at the future time.

In some embodiments, the frequency hub receives user input identifying one or more devices as a priority device. The frequency hub may identify one or more frequency channels which are predicted to not have interference at a future time and transmit a signal instructing the priority device to use one or more of the frequency channels predicted to not have interference at the future time. In some embodiments, the user input includes device information describing the one or more devices, such as device type, active hours, identifying information of the device, etc. The frequency hub may additionally use the device information to predict whether there will be interference on the frequency channel at a future time. In some embodiments, the frequency hub obtains the device information from the signals detected from the device.

In some embodiments, the frequency hub creates a schedule for each of the user devices which outlines when each user device should transmit signals using one or more specified frequency channels predicted to not have interference at a future time. The frequency hub may transmit the schedule to individual user devices. The frequency hub may transmit one or more signals instructing each of the user devices to use a specified frequency channel based on the created schedule. The frequency hub may create the schedule based on the predictions of whether one or more of the frequency channels will have interference at one or more future times. The frequency hub may additionally base the schedule on one or more of: a device's priority, the device's active hours, the device's type, the type of data being transmitted by the device, etc.

Figure 8:
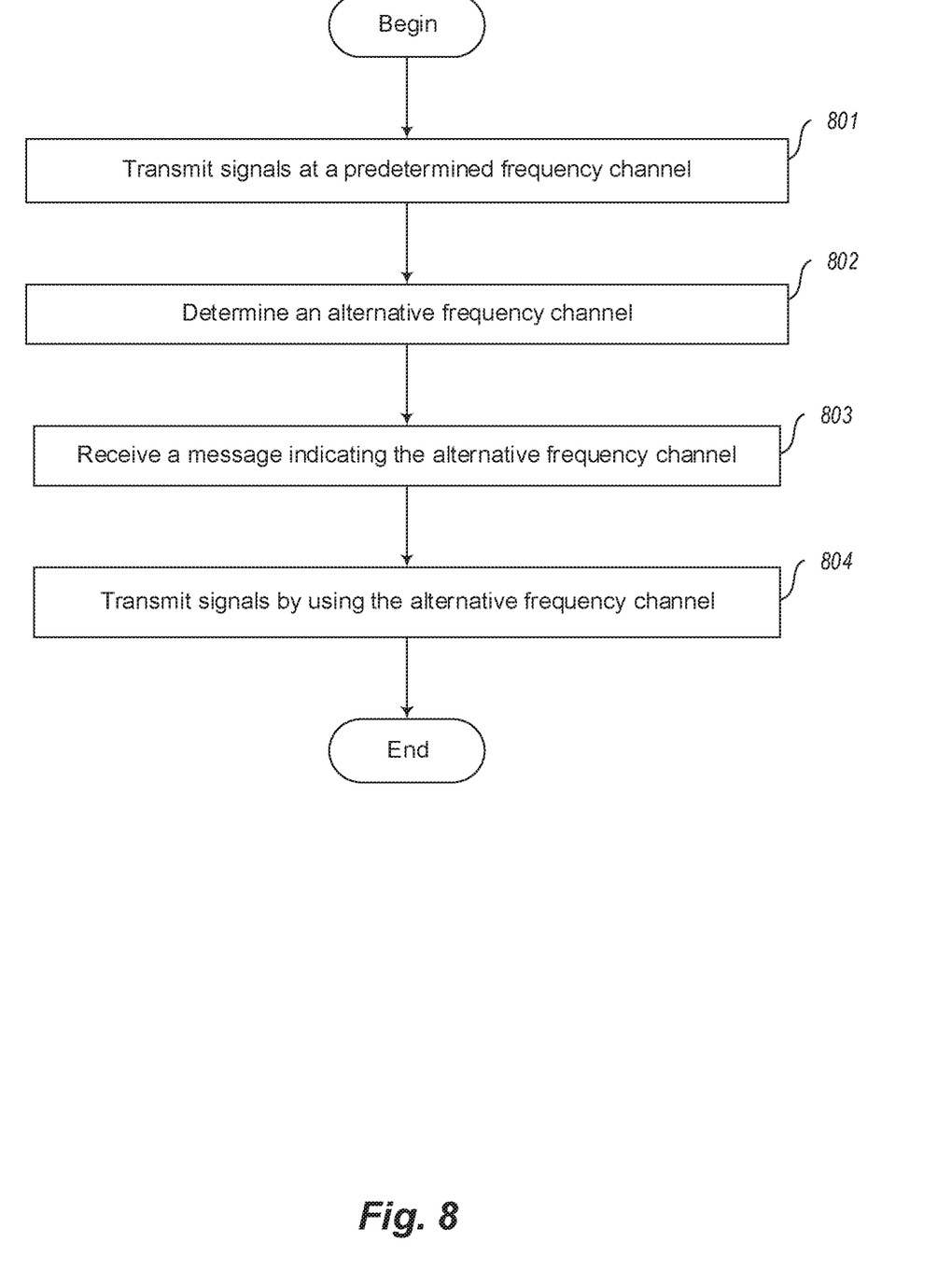
FIG. 8 is a flow diagram depicting a process for receiving an alternative frequency channel based on a prediction that there will be future interference, according to various embodiments described herein.

FIG. 8 is a flow diagram depicting a process for receiving an alternative frequency channel based on a prediction that there will be future interference, according to various embodiments described herein. At act 801, a user device transmits signals at a predetermined frequency channel. At act 802, a frequency hub predicts whether there will be interference on the frequency channel at a future time, and transmits an indication to use an alternative frequency channel to the device. At act 803, the device receives a message from the frequency hub indicating that the device should use the alternative frequency channel at the future time. At act 804, the device transmits signals by using the alternative frequency channel.

In some embodiments, the device receives an indication of a future time from the frequency hub, and the device begins transmitting signals by using the alternative frequency channel at the future time. The device may receive an indication of a prohibited frequency channel from the frequency hub. The device may transmit signals at a frequency channel other than the prohibited frequency channel at the future time. In some embodiments, the device transmits signals including identifying information of the device to the frequency hub.

In some embodiments, the frequency hub utilizes an artificial neural network, machine learning and/or other artificial intelligence components of the system to predict whether there will be interference on the channel at a future time and/or to determine an alternate frequency channel. The artificial neural network may be trained to assign predict whether there will be interference on the frequency channel and/or to determine an alternate frequency channel based on at least the determination of whether there is interference on the channel and the time the signals were detected. The artificial neural network may be trained by using a dataset including determinations of whether there is interference on a frequency channel, signal strengths, packet error rates, times frequencies are detected, etc. The artificial neural network may be retrained as the frequency interference prediction system obtains additional signal data and additional data describing when interference is detected on the frequency. The frequency hub may obtain data from other frequency hubs, and use the obtained data to determine the alternative frequency channel. The frequency hub may also communicate with other frequency hubs to ensure the most efficient use of the frequency channels available to both the frequency hub and the other frequency hubs. The frequency hub may also negotiate with other frequency hubs, even those not owned by the same user, to ensure the most efficient use of the available bandwidth. For example, in some embodiments, devices owned by the same user may include or consist of devices that are accessible and/or controlled by the same user.

Figure 9:
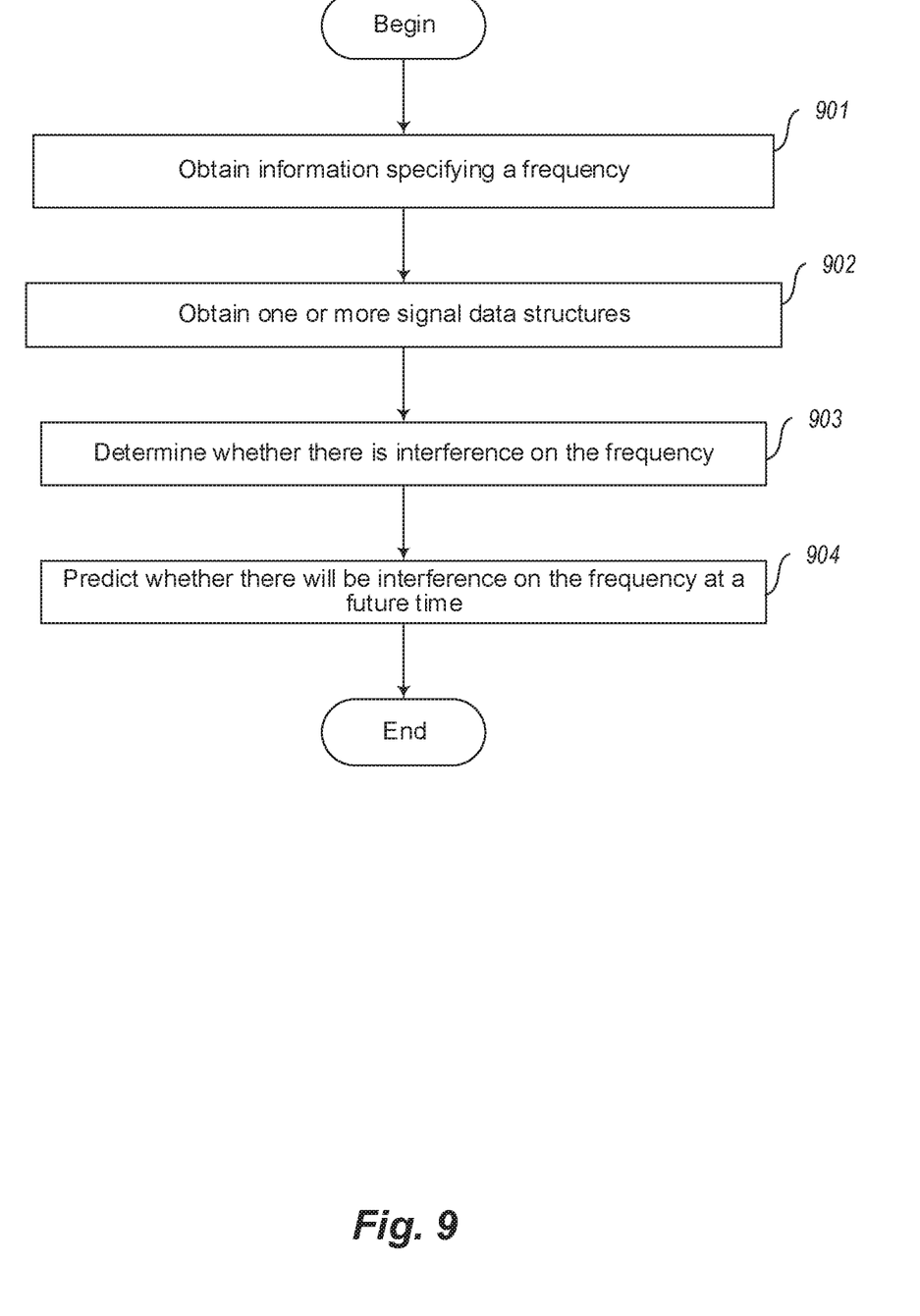
FIG. 9 is a flow diagram depicting a process including obtaining information specifying a frequency and obtaining signal data structures for predicting whether there will be interference on the frequency, according to various embodiments described herein.

FIG. 9 is a flow diagram depicting a process including obtaining information specifying a frequency and obtaining signal data structures for predicting whether there will be interference on the frequency, according to various embodiments described herein. At act 901, the frequency hub obtains information specifying a frequency. In some embodiments, the information specifying a frequency specifies one or more wireless frequencies, such as frequencies for: WiFi, Bluetooth, ZigBee, Cellular Telephone frequencies such as 3G, 4G, LTE, RFID, etc. At act 902, the frequency hub obtains one or more signal data structures including information specifying a packet error rate of a signal, a signal strength of the signal, and a time the signal was detected. At act 903, the frequency hub uses the one or more signal data structures to determine whether there is interference on the frequency. At act 904, the frequency hub predicts whether there will be interference on the frequency at a future time based on the data stored in the signal data structures and the determination of whether there is interference on the frequency.

In some embodiments, the signal data structures further include information specifying the frequency channel of the signal. The frequency hub may use the information specifying the frequency channel to determine whether there is interference on the frequency channel. The frequency hub may use the information specifying the frequency channel to predict whether there will be interference on the frequency channel at a future time.

In some embodiments, the frequency interference prediction data structure further includes information specifying one or more devices. The one or more devices may be devices which the signals originated from. The information specifying one or more devices may include a device type for a device, a frequency channel the device is permitted to use, and a frequency channel the device is prohibited from using. The information specifying one or more devices may further include information specifying a device priority. The information specifying a device priority may be used to create a schedule for signal transmission on a frequency channel based on the prediction of whether there will be interference on the frequency channel. The frequency interference prediction data structure further includes information specifying active hours for a user, a device, and/or a group of devices. The frequency interference prediction data structure may be used to alter the created schedule.

In some embodiments, the frequency interference prediction data structure is utilized to train an artificial neural network, machine learning and/or other artificial intelligence components of the system to predict whether there will be interference on the channel at a future time and/or to determine an alternate frequency channel. The artificial neural network may be trained to assign predict whether there will be interference on the frequency channel and/or to determine an alternate frequency channel based on at least the determination of whether there is interference on the channel and the time the signals were detected. The artificial neural network may be trained by using a dataset including determinations of whether there is interference on a frequency channel, signal strengths, packet error rates, times frequencies are detected, etc. The artificial neural network may be retrained as the frequency interference prediction system obtains additional signal data and additional data describing when interference is detected on the frequency. The frequency hub may obtain data from other frequency hubs, and use the obtained data to determine the alternative frequency channel. The frequency hub may also communicate with other frequency hubs to ensure the most efficient use of the frequency channels available to both the frequency hub and the other frequency hubs. The frequency hub may also negotiate with other frequency hubs, even those not owned by the same user, to ensure the most efficient use of the available bandwidth. For example, in some embodiments, devices owned by the same user may include or consist of devices that are accessible and/or controlled by the same user.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A frequency interference prediction system, comprising:
   at least one processor; and
   at least one memory coupled to the at least one processor, the memory having computer-executable instructions stored thereon that, when executed by the at least one processor, cause the system to:
      electronically detect one or more signals transmitted from one or more devices at a specified frequency over a period of time;
      for each of the one or more signals:
         electronically detect a packet error rate of the signal;
         electronically detect a signal strength of the signal;
         electronically record a time the signal was detected;
         electronically detect a frequency channel of the signal;
         electronically determine whether there is interference on the frequency channel based on one or more of: the packet error rate and the signal strength; and
         electronically record the determination of whether there is interference on the frequency channel and the time the signal was detected;
      train a machine learning model to predict whether there will be future interference on a frequency channel based on the packet error rate, the time the signal was detected, and the determination of whether there was interference on the frequency channel for at least one signal of the one or more signals;
      electronically predict, via the machine learning model, whether there will be future interference on one or more frequency channels used by the one or more devices to transmit the one or more signals;
      electronically receive an indication that at least one device of the one or more devices is a priority device;
      electronically identify second one or more frequency channels based on the indication of the at least one priority device and the prediction of whether there will be future interference;
      electronically transmit a signal instructing at least a portion of the one or more devices, the portion of the one or more devices including the at least one priority device, to transmit signals at a future time by using the second one or more frequency channels.

2. The frequency interference prediction system of claim 1, wherein the computer-executable instructions, when executed by the at least one processor, further cause the at least one processor to:

electronically identify at least one of the one or more frequency channels which is predicted not to have interference at a future time; and
electronically transmit a signal instructing at least one of the one or more devices to transmit signals at the future time by using the at least one of the one or more frequency channels which is predicted not to have interference at the future time.

3. The frequency interference prediction system of claim 1, wherein the computer-executable instructions, when executed by the at least one processor, further cause the at least one processor to:
electronically identify at least one of the one or more frequency channels which is predicted to have interference at a future time; and
electronically transmit a signal instructing at least one of the one or more devices not to use the at least one of the one or more frequency channels which is predicted to have interference at the future time to transmit signals at the future time.

4. The frequency interference prediction system of claim 1, wherein the computer-executable instructions, when executed by the at least one processor, further cause the at least one processor to:
electronically receive user input identifying at least one of the one or more devices as a priority device.

5. The frequency interference prediction system of claim 1, wherein the computer-executable instructions, when executed by the at least one processor, further cause the at least one processor to:
electronically create a schedule for each of the one or more devices to transmit signals by using at least one of the one or more frequency channels based on the prediction of whether there will be future interference on the one or more frequency channels; and
electronically transmit a signal instructing at least one of the one or more devices to transmit signals on the at least one of the one or more frequency channels based on the created schedule.

6. The frequency interference prediction system of claim 5, wherein the computer-executable instructions, when executed by the at least one processor, further cause the at least one processor to:
electronically receive user input identifying at least one of the one or more devices as a priority device; and
electronically modify the created schedule based on the user input identifying the priority device.

7. The frequency interference prediction system of claim 1, wherein the computer-executable instructions, when executed by the at least one processor, further cause the at least one processor to:
electronically receive device information describing at least one of the one or more devices; and
electronically predict whether there will be future interference on at least one of the one or more frequency channels based on one or more of: the determination of whether there is interference on the frequency channel, the time the signal was detected, and the device information.

8. The frequency interference prediction system of claim 1, wherein at least one of the one or more devices is a foreign device.

9. The frequency interference prediction system of claim 1, wherein the computer-executable instructions, when executed by the at least one processor, further cause the at least one processor to:
electronically receive, from a second interference prediction system, a second prediction of whether there will be future interference on one or more frequency channels;
electronically generate a schedule for each of the one or more devices to transmit signals by using at least one of the one or more frequency channels based on the prediction of whether there will be future interference on the one or more frequency channels and the second prediction of whether there will be future interference on the one or more frequency channel; and
electronically transmit a signal instructing at least one of the one or more devices to transmit signals on the at least one of the one or more frequency channels based on the created schedule.

10. The frequency interference prediction system of claim 1, to electronically receive an indication that at least one device of the one or more devices is a priority device, the at least one processor is further caused to:
electronically receive an indication of device information for each device of the one or more devices;
electronically determine, based on the device information, whether at least one device of the one or more devices is a priority device.

11. One or more storage devices collectively storing a frequency interference prediction data structure for access and processing by a program being executed by at least one computer processor that, when accessed and processed by the at least one computer processor, functionally enables the computer processor to:
determine whether there is interference on a frequency; and
predict whether there will be interference on the frequency at a future time, the data structure comprising:
information specifying the frequency;
information specifying one or more devices, the information specifying one or more devices including an indication of whether at least one device of the one or more devices is a priority device; and
information specifying one or more signal data structures, the signal data structures including:
information specifying a packet error rate of a signal;
information specifying a signal strength of the signal; and
information specifying a time the signal was detected,
such that the one or more signal data structures are usable to determine whether there is interference on the frequency,
such that the one or more signal data structures are usable to train a machine learning model to predict whether there will be future interference on the frequency based on information specifying a packet error rate of a signal, information specifying a signal strength of a signal, information specifying a time a signal was detected, and a determination of whether there is interference on the frequency,
such that the one or more signal data structures, the determination of whether there is interference on the frequency, and the machine learning model are usable to predict whether there will be interference on the frequency at a future time based on the time one or more signals indicated by the one or more signal data structures are detected and the determination of whether there is interference on the frequency, and
such that the prediction of whether there will be interference on the frequency at the future time and the information indicating whether at least one device is a priority device are usable to determine a second one or more frequency channels.

12. The one or more storage devices of claim 11, wherein the one or more signal data structures for access and processing by a program being executed by at least one computer processor further comprise information specifying a frequency channel of the signal, such that the one or more signal data structures, the determination of whether there is interference on the frequency, and the frequency channel of the signal are usable to predict whether there will be interference on the frequency at a future time.

13. The one or more storage devices of claim 12, wherein the frequency interference prediction data structure for access and processing by a program being executed by at least one computer processor further comprise:
    information specifying one or more devices, the information specifying one or more devices including:
    information specifying a device type;
    information specifying a frequency channel the device is permitted to use; and
    information specifying a frequency channel the device is prohibited from using.

14. The one or more storage devices of claim 13, wherein the information specifying one or more devices further comprises information specifying whether the device is a foreign device.

15. The one or more storage devices of claim 13, wherein the frequency interference prediction data structure further comprises:
    information specifying a second prediction of whether there will be interference on the frequency at a future time, the information specifying a prediction of whether there will be interference on the frequency at a future time being obtained by a second computer processor, such that the information specifying one or more devices is usable to create a schedule for signal transmission on a frequency channel based on the prediction of whether there will be interference on the frequency channel at a future time and the second prediction of whether there will be interference on the frequency at a future time.

16. The one or more storage devices of claim 13, wherein the information specifying one or more devices further comprises:
    information specifying a device priority,
    such that the information specifying one or more devices is usable to create a schedule for signal transmission on a frequency channel based on the prediction of whether there will be interference on the frequency channel at a future time.

17. The one or more storage devices of claim 16, wherein the frequency interference prediction data structure for access and processing by a program being executed by at least one computer processor further comprises:
    information specifying active hours for a user,
    such that the schedule can be modified based on the information specifying active hours for a user.

* * * * *